US012695995B2

(12) United States Patent
Fortin-Deschenes et al.

(10) Patent No.: US 12,695,995 B2
(45) Date of Patent: Jul. 28, 2026

(54) ADAPTIVE EXPOSURE

(71) Applicant: Apple Inc., Cupertino, CA (US)

(72) Inventors: Simon Fortin-Deschenes, Santa Clara, CA (US); Christian I Moore, Sunnyvale, CA (US); Daniel A Glynn, Sunnyvale, CA (US); Anthony Ghannoum, Montreal (CA); Paolo Di Febbo, Sunnyvale, CA (US); Luke A Pillans, San Diego, CA (US); Christophe Seyve, Saratoga, CA (US); Zhongmin Wang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/634,197

(22) Filed: Apr. 12, 2024

(65) Prior Publication Data

US 2024/0348933 A1     Oct. 17, 2024

Related U.S. Application Data

(60) Provisional application No. 63/459,407, filed on Apr. 14, 2023.

(51) Int. Cl.
*H04N 23/73* (2023.01)
*H04N 13/239* (2018.01)
(Continued)

(52) U.S. Cl.
CPC .......... *H04N 23/73* (2023.01); *H04N 13/239* (2018.05); *H04N 13/296* (2018.05);
(Continued)

(58) Field of Classification Search
CPC ............................... H04N 23/73; H04N 5/255
See application file for complete search history.

(56) References Cited

U.S. PATENT DOCUMENTS 7,099,056 B1 * 8/2006 Kindt ..................... H04N 23/71
358/475
9,087,471 B2 7/2015 Miao
(Continued)

FOREIGN PATENT DOCUMENTS

CN 112584127 A 3/2021
CN 115016752 A 9/2022
(Continued)

OTHER PUBLICATIONS

European Patent Office (ISA/EP), International Search Report and Written Opinion of the International Searching Authority, International Application No. PCT/US2024/045477, 18 pages, Jan. 24, 2025.
(Continued)

*Primary Examiner* — Clifford Hilaire
(74) *Attorney, Agent, or Firm* — Thompson Hine LLP

(57) ABSTRACT

Various implementations disclosed herein improve the appearance of captured video by accounting for motion-induced blur, noise, lighting, and/or other factors related to the appearance of video captured by rotating or otherwise moving wearable electronic device. Some implementations reduce or eliminate camera motion blur during video capture by dynamically adjusting the exposure used to capture the video based on user motion. For example, exposure may be reduced to reduce the amount of blur during motion. Since such a reduced exposure captures a lesser amount of light, gain may be increased such that the captured video maintains a relatively constant image brightness in spite of the changing exposure over time.

24 Claims, 5 Drawing Sheets

400

Detect motion of an electronic device worn by a user using a sensor while video is captured via an imaging component of the electronic device and presented via a display of the electronic device — 410

Determine an exposure parameter based on the motion of the electronic device — 420

Adjust an exposure of the imaging component used to capture the video based on the determined exposure parameter — 430

Present the video on the display of the electronic device worn by the user — 440

(51) Int. Cl.

| | |
|---|---|
| *H04N 13/296* | (2018.01) |
| *H04N 13/344* | (2018.01) |
| *H04N 13/371* | (2018.01) |
| *H04N 13/383* | (2018.01) |
| *H04N 23/68* | (2023.01) |
| *H04N 23/71* | (2023.01) |
| *H04N 23/745* | (2023.01) |
| *H04N 23/76* | (2023.01) |

(52) U.S. Cl.
CPC ......... *H04N 13/344* (2018.05); *H04N 13/371* (2018.05); *H04N 13/383* (2018.05); *H04N 23/6812* (2023.01); *H04N 23/684* (2023.01); *H04N 23/71* (2023.01); *H04N 23/745* (2023.01); *H04N 23/76* (2023.01)

(56) References Cited

U.S. PATENT DOCUMENTS

| | | | |
|---|---|---|---|
| 9,286,717 | B2 | 3/2016 | Le |
| 9,726,893 | B2 | 8/2017 | Gao et al. |
| 10,504,243 | B2 | 12/2019 | Linde et al. |
| 10,587,817 | B2 | 3/2020 | Kim et al. |
| 10,748,340 | B1 | 8/2020 | Zhang et al. |
| 10,885,701 | B1 | 1/2021 | Patel |
| 11,314,321 | B2 | 4/2022 | Steedly et al. |
| 11,363,188 | B2 | 6/2022 | Price et al. |
| 11,504,609 | B2 | 11/2022 | Mikhailov et al. |
| 2001/0048763 | A1* | 12/2001 | Takatsuka ............ H04N 13/296 348/E13.052 |
| 2004/0218914 | A1* | 11/2004 | Sato ...................... G03B 17/00 396/52 |
| 2006/0152598 | A1* | 7/2006 | Kawarada ............ H04N 23/745 348/E5.037 |
| 2009/0284616 | A1* | 11/2009 | Daiku .................... H04N 23/81 348/E5.037 |
| 2012/0086825 | A1 | 4/2012 | Yost |
| 2013/0258089 | A1* | 10/2013 | Lyons ................... H04N 23/69 348/77 |
| 2019/0004406 | A1* | 1/2019 | Fuchikami ............... G09G 3/20 |
| 2019/0108652 | A1* | 4/2019 | Linde ................... G02B 27/017 |
| 2019/0110039 | A1 | 4/2019 | Linde |
| 2019/0230297 | A1* | 7/2019 | Knorr .................. H04N 5/2224 |
| 2019/0233880 | A1* | 8/2019 | Mir ...................... C12Q 1/6876 |
| 2020/0333878 | A1 | 10/2020 | Steedly et al. |
| 2020/0389582 | A1 | 12/2020 | Herman |
| 2020/0396367 | A1 | 12/2020 | Segapelli et al. |
| 2021/0004996 | A1 | 1/2021 | Murillo et al. |
| 2021/0051260 | A1* | 2/2021 | Lee ...................... H04N 23/681 |
| 2021/0058551 | A1 | 2/2021 | Tarifa |
| 2021/0152724 | A1 | 5/2021 | Pohl |
| 2021/0208390 | A1* | 7/2021 | Price .................... H04N 13/261 |
| 2021/0400185 | A1 | 12/2021 | Price |
| 2022/0060619 | A1 | 2/2022 | Pinhasov et al. |
| 2023/0087663 | A1 | 3/2023 | Araki |
| 2023/0100795 | A1 | 3/2023 | Sun et al. |
| 2023/0179868 | A1 | 6/2023 | Nikhara |
| 2023/0222741 | A1 | 7/2023 | Gruen et al. |
| 2023/0260228 | A1 | 8/2023 | Jia et al. |
| 2023/0283886 | A1 | 9/2023 | Kocienda |
| 2023/0388658 | A1 | 11/2023 | Feng |
| 2023/0421914 | A1 | 12/2023 | Molholm |
| 2025/0111589 | A1 | 4/2025 | Fortin-Deschenes |

FOREIGN PATENT DOCUMENTS

| | | |
|---|---|---|
| CN | 115529419 A | 12/2022 |
| EP | 4243403 A1 | 9/2023 |
| WO | 2020208421 A1 | 10/2020 |
| WO | 2021227163 A1 | 11/2021 |
| WO | 2021257172 A1 | 12/2021 |
| WO | 2022060547 A1 | 3/2022 |
| WO | 2022066399 A1 | 3/2022 |
| WO | 2022066400 A1 | 3/2022 |

OTHER PUBLICATIONS

European Patent Office (ISA/EP), Invitation to Pay Additional Search Fees, Partial International Search and Provisional Opinion, International Application No. PCT/US2024/023659, 14 pages, Jun. 24, 2024.

European Patent Office (ISA/EP), Invitation to Pay Additional Fees, Partial International Search and Provisional Opinion, International Application No. PCT/US2024/045477, 17 pages, Dec. 3, 2024.

European Patent Office (ISA/EP), International Search Report and Written Opinion of the International Searching Authority, International Application No. PCT/US2024/023659, 18 pages, Aug. 16, 2024.

Luidolt, et al., "Gaze-Dependent Simulation of Light Perception in Virtual Reality", IEEE Transactions on Visualization and Computer Graphics, vol. 26, No. 12, Dec. 2020, pp. 3557-3567 (11 pages).

Itoh, et al., "Semi-Parametric Color Reproduction Method for Optical See-Through Head-Mounted Displays", IEEE Transactions on Visualization and Computer Graphics, vol. 21, No. 11, Nov. 2015, pp. 1269-1278 (Ten (10) pages).

* cited by examiner

120

Processing Unit(s) 802

Comm. Interface(s) 808

Display(s) 812

Memory 820

Operating System 830

Instruction Set(s) 840

Movement Tracking Instruction Set 842

Adaptive Exposure Instruction Set 844

Presentation Instruction Set 846

804

I/O Device(s) & Sensor(s) 806

Programming Interface(s) 810

Image Sensor System(s) 814

ADAPTIVE EXPOSURE

CROSS-REFERENCE TO RELATED APPLICATIONS

This Application claims the benefit of U.S. Provisional Application Ser. No. 63/459,407 filed Apr. 14, 2023, which is incorporated herein in its entirety.

TECHNICAL FIELD

The present disclosure generally relates to improving the appearance of video images captured and displayed by electronic devices and more specifically to systems, methods, and devices that adaptively adjust the exposure of video capture to account for motion-induced blur, noise, lighting, or other factors related to video appearance.

BACKGROUND

Movement of electronic devices capturing video can result in blurriness, i.e., camera-motion blur. For example, as an electronic device is rotated from left to right or vice versa during video capture, the video images may include horizontally-blurred content. Existing techniques may not adequately address such motion and/or other factors related to the appearance of video captured by electronic devices.

SUMMARY

Various implementations disclosed herein improve the appearance of captured video by accounting for motion-induced blur, noise, lighting, and/or other factors related to the appearance of video captured by a rotating or otherwise moving wearable electronic device. Some implementations reduce or eliminate camera motion blur during video capture by dynamically adjusting the exposure used to capture the video based on detecting user motion. For example, exposure may be reduced to reduce the amount of blur during the motion. Since such a reduced exposure captures a lesser amount of light, gain may be increased such that the captured video maintains a relatively constant brightness in spite of the exposure adapting to the motion over time.

Some implementations are used with head-mounted devices (HMDs) that relay one or more front-facing camera feeds to display panels in front of the user's eyes to create the illusion that the user is viewing the physical environment directly. Since user head rotations/panning can result in significant camera motion blur, techniques disclosed herein reduce the exposure accordingly.

Some implementations further account for the increase in noise that may result from reducing the exposure. For example, to avoid excessive noise, a minimum exposure may be determined, e.g., the exposure may be reduced based on motion but only to the point that a threshold maximum amount of noise is produced. In some implementations, a minimum exposure to avoid excessive noise is determined based on using the light in the scene as an approximation of the noise. One approximation for the light in the scene is determined by calculating the visibility of noise including a tone mapping curve, sensor histogram, exposure settings, etc. One approximation for light in the scene is determined using a formula, e.g., exposure times gain, which is referred to herein as EIT.

Adjustments to exposure may also be determined based on the persistence of displayed content, e.g., how long each frame is displayed, or the latency of the system, e.g., how long it takes to determine and act upon device motion, where the user is looking (e.g., direction and distance), and/or lighting characteristics such as flickering light sources in the physical environment.

In some exemplary implementations, a processor executes instructions stored in a computer-readable medium to perform a method. The method may be performed at a head-mounted device (HMD) having a processor, one or more cameras, and one or more displays. The method detects motion corresponding to a rotation of the HMD using a sensor and determines an exposure parameter based on the motion of the HMD. The method adjusts an exposure of the one or more cameras based on the determined exposure parameter. The method captures video of a physical environment via the one or more cameras of the HMD according to the adjusted exposure and presenting a view on the one or more displays of the HMD based on the captured video, the view providing a viewpoint of physical environment.

The method may be performed at a head-mounted device (HMD) having a processor and one or more left-eye outward facing cameras associated with a left-eye viewpoint and one or more right-eye outward facing cameras associated with a right-eye viewpoint. The method may provide pass-through video via the HMD in which video captured via the one or more left-eye outward facing cameras is presented on a left-eye display to provide a live view of a physical environment from the left-eye viewpoint and video captured via the one or more right-eye outward facing cameras is presented on a right-eye display to provide the live view of the physical environment from the right-eye viewpoint. The passthrough video(s) may be modified transformed to account for differences in the cameras' positions and the eye positions. The pass-through video(s) may be provided a hardware-encoded rendering process that combines images from the cameras with virtual content in views provided to each eye.

The method may determine an exposure parameter (e.g., maximum exposure, minimum exposure, exposure target value, etc.) based on the motion of the HMD. In one example, if a user's head is moving quickly, a maximum exposure for current conditions is determined based on a motion curve corresponding to providing a constant blur amount.

The method may adjust an exposure of the imaging component used to capture the video based on the determined exposure parameter. For example, given a maximum exposure value, a minimum exposure value, or both, an exposure value may be determined that is appropriate for the circumstances and conditions. An exposure, in various implementations, may be determined based on factors including, but not limited to, detected motion, detected lighting, gain settings, where a user is looking, display persistence, motion-response lag, system power and processing resources, and other such factors. The method presents the video on the display of the HMD.

In some implementations, the detected motion corresponds to a rotation of the electronic device and/or a head upon which the electronic device is worn. In some implementations, the motion corresponds to a change in a six degree of freedom pose of the electronic device and/or a head upon which the electronic device is worn. In some implementations, the motion is detected via an inertial measurement unit or gyroscope of the electronic device. In some implementations, the motion is detected based on changes in image data in successive frames.

In some implementations, the exposure parameter is a maximum exposure. Such a maximum exposure may be determined based on the motion and a motion curve corresponding to a constant blur amount.

In some implementations, the method adjusts a gain based on the adjusting of the exposure to provide an approximately constant amount of light.

In some implementations, the exposure may be adjusted based on a minimum exposure determined to ensure noise in the video signal is less than a threshold. The minimum exposure may be determined based on a measure of light, and the measure of light may be determined based on exposure and gain. The minimum exposure may be determined based on a tone mapping, or an image sensor histogram.

In some implementations, the exposure is adjusted based on a minimum exposure determined based on a persistence of the display, the persistence of the display corresponding to an amount of time each of the frames is displayed.

In some implementations, the exposure may be adjusted based on user gaze direction. The exposure may be adjusted based on determining whether the gaze direction is tracking a moving object. The exposure may be adjusted based on a distance or contrast of a portion of a physical environment at which a user is gazing.

In some implementations, the exposure is adjusted based on a head motion prediction. In some implementations, the exposure is adjusted based on a latency, the latency corresponding to time required to identify and respond to the motion, for example, with an exposure adjustment.

In some implementations, the device adjusts the exposure of two imaging components (e.g., two outward facing cameras of a HMD), each of the imaging components providing live video to one or two displays of the electronic device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory, computer-readable storage medium stores instructions, which, when executed by one or more processors of a device, cause the device to perform or cause performance of any of the methods described herein. In accordance with some implementations, a device includes one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

4

Figure 4:
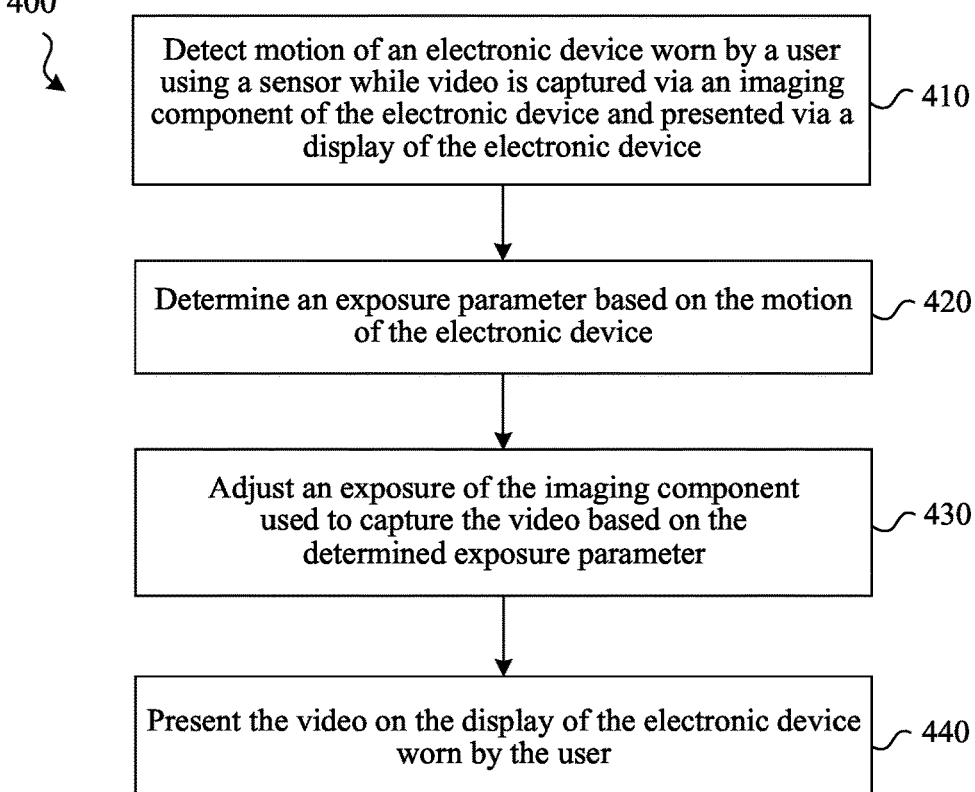

FIG. 4 is a flowchart illustrating an exemplary method of improving the appearance of video capture to account for motion in accordance with some implementations.

Figure 5A:
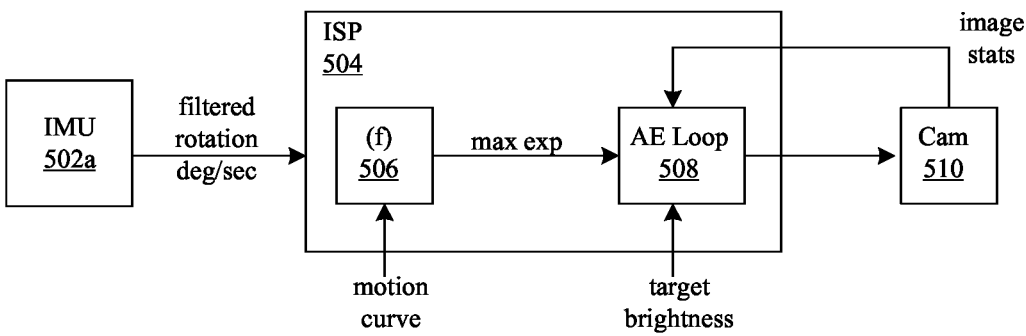
Figure 5B:
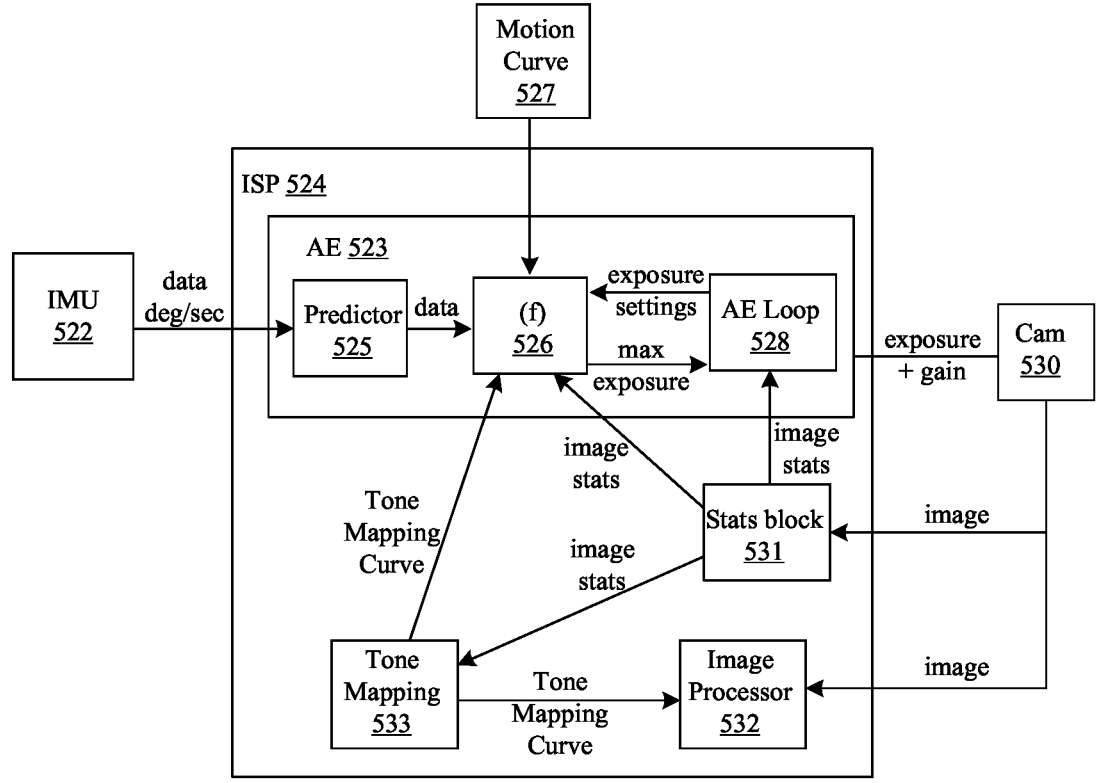

FIG. 5A-5B are system flow diagrams illustrating exemplary methods of improving the appearance of video capture to account for motion in accordance with some implementations.

Figure 6:
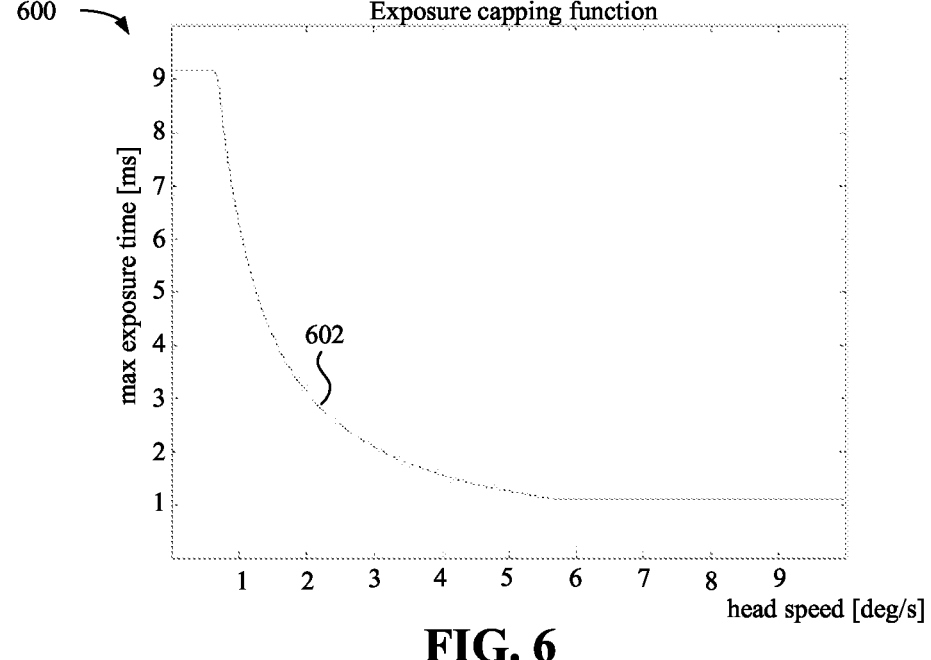

FIG. 6 illustrates an exemplary exposure capping function in accordance with some implementations.

Figure 7:
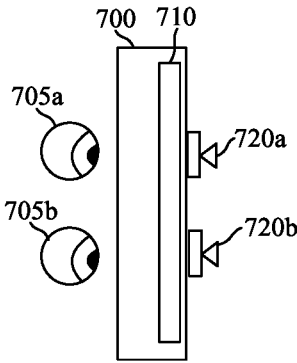

FIG. 7 illustrates an example HMD having cameras positioned to provide live video on a display corresponding to eye viewpoints, in accordance with some implementations.

Figure 8:
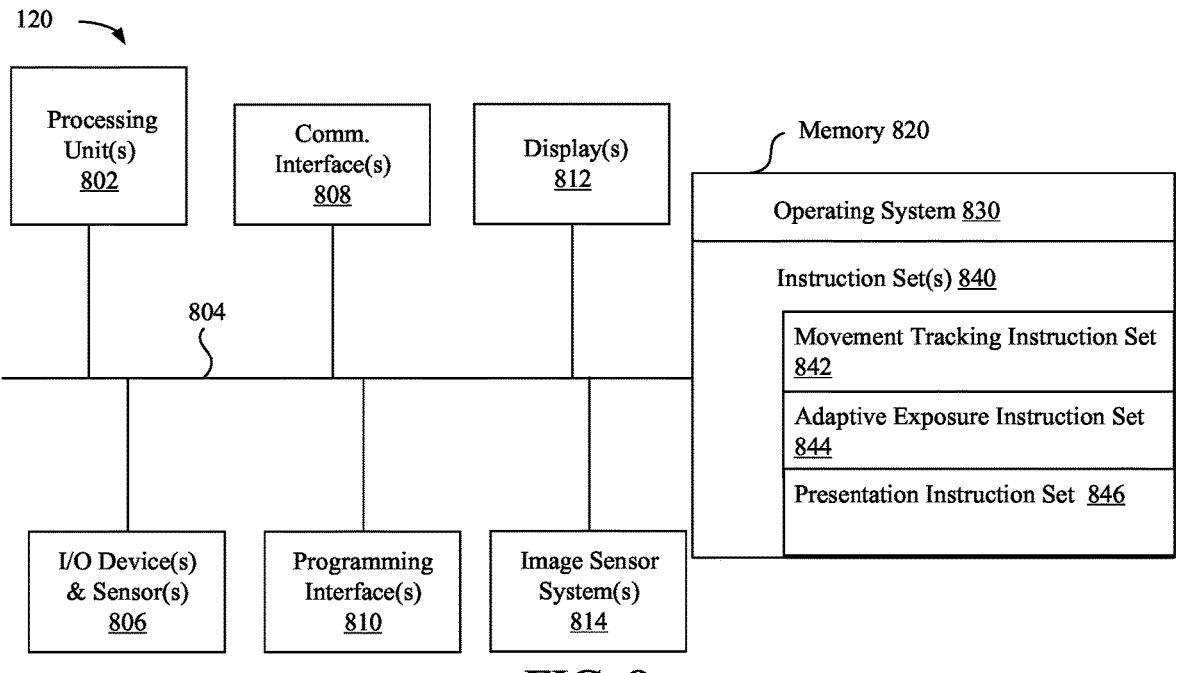

FIG. 8 illustrates an exemplary device configured in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
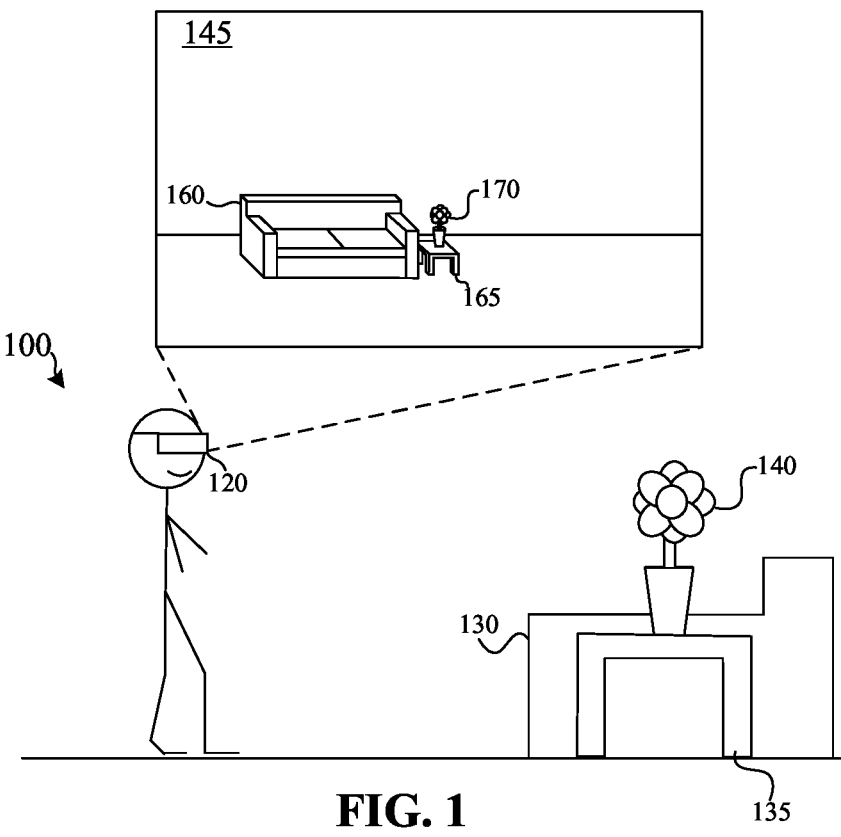
FIG. 1 illustrates an example of an electronic device used within a physical environment in accordance with some implementations.

FIG. 1 illustrates an example of an electronic device 120 used by a user within a physical environment 100. A physical environment refers to a physical world that people can interact with and/or sense without the aid of electronic systems. Physical environments, such as a physical park, include physical articles, such as physical trees, physical buildings, and physical people. People can directly sense and/or interact with the physical environment, such as through sight, touch, hearing, taste, and smell. In FIG. 1, the physical environment 100 includes a sofa 130, a table 135, and a vase with flowers 140.

In the example of FIG. 1, the electronic device 120 is illustrated as a single device. In some implementations, the electronic device 120 is worn by a user. For example, the electronic device 120 may be a head-mounted device (HMD) as illustrated in FIG. 1. Some implementations of the electronic device 120 are hand-held. For example, the electronic device 120 may be a mobile phone, a tablet, a laptop, and so forth. In some implementations, functions of the electronic device 120 are accomplished via two or more devices, for example, additionally including an optional base station. Other examples include a laptop, desktop, server, or other such devices that includes additional capabilities in terms of power, CPU capabilities, GPU capabilities, storage capabilities, memory capabilities, and the like. The multiple devices that may be used to accomplish the functions of the electronic device 120 may communicate with one another via wired or wireless communications.

Electronic device 120 captures and displays video of the physical environment 100. In this example, a first frame 145 of the video is captured and displayed at the electronic device 120. The first frame 145 may be captured and displayed in a serial manner (e.g., as part of a sequence of captured frames in the same order in which the frames were captured). In some implementations the first frame 145 is displayed simultaneously with the capture, e.g., during a live video feed. In some implementations, the first frame 145 is displayed after a latency period or otherwise at a time after the recording of the video. The first frame 145 includes a depiction 160 of the sofa 130, a depiction 165 of the table 135, and a depiction 170 of the vase with flowers 140. Because the electronic device 120 is stationary, e.g., not rotating/panning, the depictions 160, 165, 170 are clear, i.e., having no blur.

Figure 2:
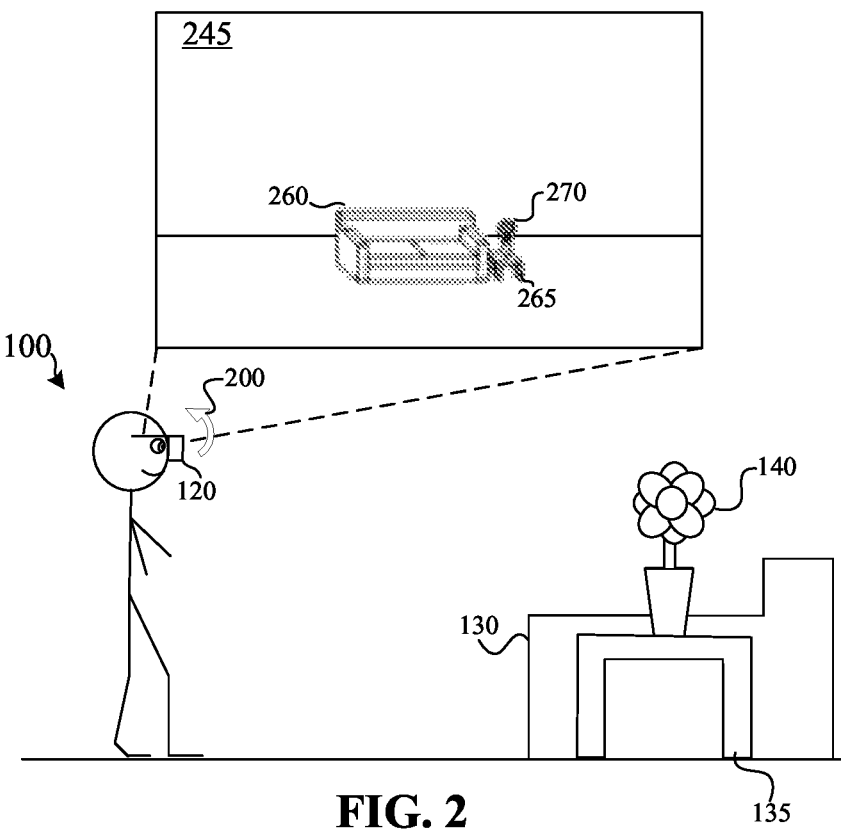
FIG. 2 illustrates an example of the electronic device moving while acquiring video in the physical environment of FIG. 1.

In contrast, FIG. 2 illustrates an example of the electronic device 120 moving (e.g., panning in a direction shown by arrow 200) while acquiring video in the physical environment 100. In this example, a second frame 245 of the video is captured and displayed at the electronic device 120. The second frame 245 may be captured and displayed in a serial manner (e.g., as part of a sequence of captured frames in the same order in which the frames were captured). In some implementations the second frame 245 is displayed simultaneously with the capture. In some implementations, the second frame 245 is displayed after a latency period. The second frame 245 includes a depiction 260 of the sofa 130, a depiction 265 of the table 135, and a depiction 270 of the vase with flowers 140. Because the electronic device 120 is moving, e.g., rotating/panning, the depictions 260, 265, 270 appear blurry.

Figure 3:
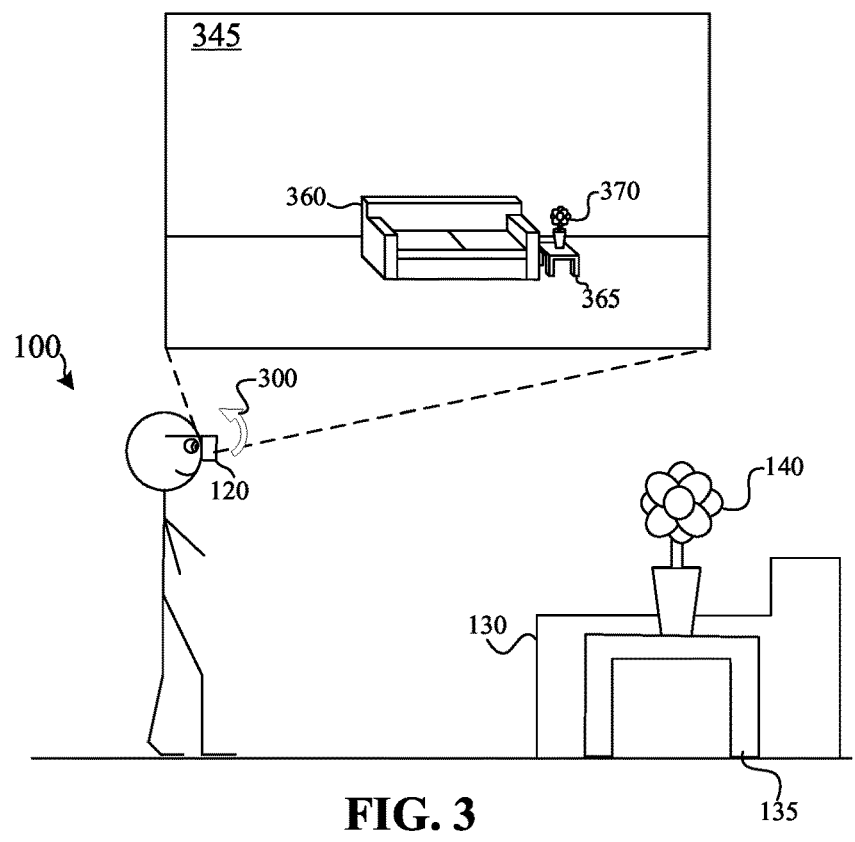
FIG. 3 illustrates an example of the electronic device adjusting exposure to account for movement occurring while acquiring video in the physical environment of FIG. 1 in accordance with some implementations.

Some implementations disclosed herein improve the appearance of captured video by accounting for motion and/or other factors. FIG. 3 illustrates an example of the electronic device 120 moving (e.g., panning as shown by arrow 300) while acquiring video in the physical environment 100, where the electronic device improve the appearance of captured video by adjusting exposure to account for motion and/or other factors. In this example, a third frame 345 of the video is captured and displayed at the electronic device 120. The third frame 345 may be captured and displayed in a serial manner (e.g., as part of a sequence of captured frames in the same order in which the frames were captured). In some implementations the third frame 345 is displayed simultaneously with the capture. In some implementations, the third frame 345 is displayed after a latency period. The third frame 345 includes a depiction 360 of the sofa 130, a depiction 365 of the table 135, and a depiction 370 of the vase with flowers 140. Because the electronic device 120 adjusts exposure based on the movement, e.g., rotating/panning, of the electronic device 120 during the capturing of the third frame 345, the depictions 360, 365, 370 appear less blurry than the depictions 260, 265, 270 of FIG. 2.

FIG. 4 is a flowchart illustrating an exemplary method 400 of improving the appearance of video capture to account for motion. In some implementations, the method 400 is performed by a device (e.g., electronic device 120 of FIG. 1). The method 400 can be performed using an electronic device or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 410, the method 400 detects motion (e.g., rotations due to user panning, translation, 6DOF head pose motion) of the wearable electronic device using a sensor (e.g., IMU/gyro) while video is captured via an imaging component of the electronic device and presented via a display of the electronic device. The video includes multiple frames and the changes in device orientation may be detected during the time period in which the multiple frames are captured. In some examples, a sensor such as a gyroscope or inertial measurement unit (IMU) is used to track or otherwise determine the motion of the electronic device. In some cases, the device current motion, e.g., for one or more frames, is used to predict the continued motion of the device, e.g., for the next one or more frames. In some implementations, position encoders/sensors (e.g., Hall sensors, capacitive sensors, optical encoder, magnetic encoder, etc.) are used. In some implementations, movement of the electronic device is detected based on image data from one or more of the images of the video or from one or more images from another image sensor on the electronic device.

The detected motion may correspond to a rotation of the electronic device and/or a head upon which the electronic device is worn. The detected motion may correspond to a change in a six degree of freedom pose of the electronic device and/or a head upon which the electronic device is worn.

At block 420, the method 400 determines an exposure parameter (e.g., maximum exposure, minimum exposure, exposure value, etc.) based on the motion of the electronic device. The exposure parameter, for example, may be based on rotational motion, translational motion, or both. The exposure parameter may be based on 6DOF motion of the device and/or portion of the user's body upon which the device is worn.

Some implementations use motion data to calculate a maximum allowable exposure to reduce motion blur. Motion blur may be undesirable to users, e.g., users viewing video passthrough on HMDs. Most motion blur on HMDs is induced due to head rotations (rather than translations). Motion blur reduction (via exposure reduction) can be provided potentially with the cost of increasing image noise.

In some implementations the exposure parameter in method 400 is a maximum exposure determined based on motion to reduce blur. For example, a maximum exposure value may be determined based on a motion curve corresponding to a constant blur amount, e.g., a blur level corresponding to a generally clear image. Such a curve (defined by a function or otherwise) may be determined to maintain such a constant blur amount. Such a curve/function may be defined by determining the maximum allowed exposure time resulting in a certain level of blur on an image sensor, e.g., using:

$$maximum\_exposure = max\_allowed\ blur/camera\_ppd/head\ rotation\ speed$$

Moreover, since some blur (e.g., retinal blur) is due to display persistence (e.g., 2.6 ms), there may be diminishing returns when lowering exposure below the persistence time (e.g., below 2.6 ms). FIG. 6 illustrates a chart 600 showing an exemplary exposure capping function in which a maximum exposure value 602 is plotted against head speed. Given an amount of head speed (e.g., in deg/s), a maximum exposure time parameter may be used in adjusting an exposure, e.g., reduce the exposure from its standard/normal time but not below the determined maximum exposure time for that head speed.

Returning to FIG. 4, a device may provide limitations that impact blur mitigation via exposure reduction. For example, a device may provide a maximum gain. If light level is to be maintained (e.g., exposure times gain held constant), then the maximum gain may limit the amount that exposure can be reduced, e.g., exposure can only be reduced to the point at which the max gain is required to achieve the constant light level. Reducing exposure beyond that would require more gain than the device can provide to achieve the desired constant image brightness and thus can be avoided (by avoiding reducing exposure to that extent).

In some implementations, there may be tradeoffs (e.g., noise, flicker, etc.) in reducing exposure based on motion. In some implementations, to address such tradeoffs, a minimum exposure is determined. In one example, a minimum exposure may be determined to ensure that noise is the video signal does not exceed a threshold. In another example, a minimum exposure is determined based on a measure of light (e.g., a proxy for the expected amount of noise), the measure of light determined/approximated based on exposure and gain. A minimum exposure may be determined based on a tone mapping, or an image sensor histogram.

Some implementations, adaptively adjusting exposure is performed using criteria that attempt to optimally balance blur, noise, and other considerations. A piecewise linear interpolation between a light approximation (e.g., EIT) and a preferred minimum exposure (e.g., based on user feedback, testing, surveys, etc.) may be used to determine a minimum exposure.

An exposure parameter may also be determined based on determining that an environment includes a flickering light source. For example, based on identifying that an environment includes a light source producing a 128 Hz flicker (e.g., strobing), an exposure time parameter may require that the exposure selected be a multiple of that period to compensate for the flicker, e.g., using a period of 8.33 ms, 16.66 ms, etc. for a 120 Hz flicker, using an exposure time of 1.67, 3.33, 5.00, 6.67, 8.33, 10, etc. with a 600 Hz flicker, etc. A system's frame rate may also provide a maximum/normal exposure period, e.g., with a 90 Hz framerate, a maximum/ normal exposure may be 10.2 ms. In some implementations, it may be desirable to reduce the exposure from such a maximum/normal exposure time to a reduced exposure time based on detecting device motion to reduce motion blur, while also accounting for a flickering light source in the environment, e.g., reducing from 10.2 ms to 8.33 ms given a 90 Hz framerate and a 120 Hz light source flicker. In some implementations, blur mitigation via motion-based exposure reduction is entirely disabled in circumstances in which a flickering light source is detected to avoid or reduce the chance or providing noticeable flickering.

An exposure parameter may be determined based on gaze direction. For example, the exposure parameter may be determined based on whether the gaze direction is tracking a moving object, e.g., based differences between eye and head orientation, gaze direction and head direction, etc. When tracking a moving object (e.g., rotating the device to follow a dog running across the room), the object is less likely to appear blurry in captured images and thus reducing exposure may be less appropriate than during other motions in which the user is not tracking an object.

The exposure parameter may be determined based on a distance and/or contrast of a portion of a physical environment at which the user is gazing. Distant object may be more likely to include noise and less likely to provide blur and thus reducing exposure may be less appropriate than in circumstances in which the user's gaze is focuses on closer portion of the physical environment. The distance to the object/portion of an environment to which a user is gazing may be determined via eye tracking, e.g., using eye vergence to estimate distance, SLAM to understand the 3D nature of the environment, depth sensor data, and/or using any other suitable distance detection technique.

An exposure parameter may be determined based on information about human motion capabilities, limits, and typical behaviors. An exposure parameter may be based on latency corresponding to time required to identify and respond to the motion. Latency may have a relatively small impact on blur over expected motion trajectories, e.g., given the way that people typically accelerate when turning their heads. Latency may have a larger impact during motion in which a head changes direction such as during shaking of the head and such an impact may be mitigated via prediction.

At block 430, the method 400 adjusts an exposure of the imaging component used to capture the video based on the determined exposure parameter. For example, an exposure value may be selected based on a maximum exposure parameter, a minimum exposure parameter, a flicker multiple, and/or other factors such as system constraints or display requirements. Gain may be adjusted based on the adjusting of the exposure to provide an approximately constant amount of light and thus a viewing experience consistent with user expectations.

At block 440, the method 400 presents the video on the display of the wearable electronic device. In some implementations, the method 400 adjusts the exposure of two imaging components, each of the imaging components providing live video to one or two displays of the electronic device.

In some implementations, the method 400 of adaptive exposure described with respect to FIG. 4 is performed for every frame of a video. In some implementations, the method 400 is performed periodically, e.g., every other frame, every $5^{th}$ frame, every $10^{th}$ frame, etc., and the determined exposure used for intervening frames. In some implementations, the method 400 is selectively performed in certain circumstances, e.g., performed when a user is expected to be rotating or moving the device during video capture but not performed when the user is unlikely to be rotating or moving the device during video capture.

FIG. 5A is a system flow diagram illustrating an exemplary method of improving the appearance of video capture to account for motion. In this example, a device movement tracker (e.g., IMU 502) tracks movement of an electronic device that includes one or more portion of the one or more cameras 510. Detected movements are provided to block 506 of ISP 504, which uses a function (f)/motion curve to determine an exposure parameter such as a maximum exposure. Block 506 and ISP 504 may be a subsystem of a general-purpose compute block containing other components, e.g., a CPU, GPU, ANE, or be part of a system on a chip (SOC) architecture and those compute resources may additionally or alternatively be used. In this example, block 504 provides a max exposure to an adaptive exposure AE loop 508 that uses a target brightness to provide an exposure to the one or more cameras 510. The cam 510 provides image stats back to the AE loop 508, which uses such stats during future adaptive exposure iterations.

The system flow of FIG. 5 may account for the visibility of noise, e.g., by turning down motion reduction. The visibility of noise may be related to a signal-to-noise ratio (SNR). The SNR may be roughly proportional to the square root of the number of photons hitting the sensor (e.g., shot noise) in many cases (e.g., not very low light, where readout noise, dark current, etc. is non-negligible). The SNR may be inversely proportional to the global tone mapping slope for a given gray level. The brightness may depend on a tone mapping slope as well as the number of photons hitting the sensor. The visibility of noise may be related to the absolute brightness of the image, e.g., due to perceptual human factors. In one example the process determines that there is a relatively large area of the image in the lower end of the image histogram to determine that the large portion of the image will have higher noise, and accordingly turn down motion reduction. If the scene has a wide dynamic range, the tone mapping curve might boost the low end of the histogram, making the noise more visible, and the process may turn down motion reduction to compensate.

The process of FIG. 5A may optionally include user/object tracking detection software that detects if the user is tracking a moving object with their gaze and/or head. The system may turn on a no-adaptive exposure mode based on detecting a user tracking an object to enhance the quality of the tracked object in the video.

FIG. 5B is a system flow diagram illustrating an exemplary method of improving the appearance of video capture to account for motion. In this example, a device movement tracker (e.g., IMU 522) tracks movement of an electronic device that includes one or more portion of the one or more cameras 530. Movement data, e.g., gyroscope data, is provided to the predictor 506 of the autoexposure block 523 of ISP 524. The predictor 525 generates movement prediction data that is provided to block 526, which uses a function (f)/determines an exposure parameter such as a maximum exposure. In this example, block 526 provides a max exposure to an adaptive exposure loop 528. The adaptive exposure loop 528 both provides exposure settings to block 526 (for use in determining the max exposure) and provides data (e.g., exposure and gain) to the one or more cameras 530. The one or more cameras 530 provide image data to stats block 531 and image processor 532. The stats block 531 provides image stats to block 526 (for use in generating the max exposure) and to the adaptive exposure block 528 (for use in determining exposure settings and producing data such as exposure and gain data). The stats block 531 also provides image stats to the tone mapping block 533, which provides tone mapping data (e.g., a tone mapping curve) to the block 525 for use in determining the max exposure). The tone mapping block 533 also sends the tone mapping data (e.g., a tone mapping curve) image processor 532. The image processing block 532 processes the image data from the one or more cameras 530 using the tone mapping data, such as a tone mapping curve, from the tone mapping block 533.

FIG. 7 illustrates an example HMD 700 having cameras positioned to provide live video on a display 710 corresponding to eye viewpoints. In this example, the HMD includes a left-eye outward facing camera 720a associated with a left-eye's 705a viewpoint and a right-eye outward facing camera 720b associated with a right-eye's 705b viewpoint. In other implementations, multiple cameras may be associated with each eye's viewpoint. In the example, of FIG. 7, the display 710 may be partitioned to display content from the cameras 720a-b, e.g., having a left portion displaying video captured by left eye camera 720a and a right portion displaying video captured by right eye camera 720b. In another example, a separate display (rather than a single display) is provided for each eye.

FIG. 8 is a block diagram illustrating exemplary components of the electronic device 120 configured in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 802 (e.g., DSPs, microprocessors, ASICS, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment (e.g., a 3D environment) to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the electronic device 120 includes a single display. In another example, the electronic device 120 includes a display for each eye of the user.

In some implementations, the one or more image sensor systems 814 are configured to obtain image data that corresponds to at least a portion of the physical environment 100. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data. In various implementations, the one or more image sensor systems include an optical image stabilization (OIS) system configured to facilitate optical image stabilization according to one or more of the techniques disclosed herein.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a movement tracking instruction set 842, an adaptive exposure instruction set 844, and a presentation instruction set 846. The instruction set(s) 840 may be embodied a single software executable or multiple software executables. In alternative implementations software is replaced by dedicated hardware, e.g., silicon. In some implementations, the movement tracking instruction set 842 is executable by the processing unit(s) 802 (e.g., a CPU) to track the rotation/panning and/or other movements of the electronic device 120 as described herein. In some implementations, the adaptive exposure instruction set 844 is executable by the processing unit(s) 802 (e.g., a CPU) to adapt exposure of the one or more cameras of the electronic device 120 to improved image capture as described herein. In some implementations, the presentation instruction set 846 is executable by the processing unit(s) 802 (e.g., a CPU) to present captured video content (e.g., as one or more live video feeds) as described herein. To these ends, in various implementations, these units include instructions and/or logic therefor, and heuristics and metadata therefor.

Although the instruction set(s) 840 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a head-mounted device (HMD) having a processor, one or more cameras, and one or more displays:

detecting a current motion corresponding to a current rotation of the HMD during the capture of multiple frames by the one or more cameras in a physical environment, using a sensor wherein the current rotation is detected using an inertial measurement unit or a gyroscope;

predicting a continued rotation of the device for one or more next frames after the multiple frames based on the current rotation;

determining an exposure parameter to limit the appearance of blur that would result from the continued rotation of the HMD, wherein the exposure parameter is a maximum exposure time resulting in a predetermined level of blur on an image sensor;

adjusting an exposure of the one or more cameras based on the determined exposure parameter;

capturing video comprising the one or more next frames of the physical environment via the one or more cameras of the HMD according to the adjusted exposure; and presenting a view on the one or more displays of the HMD based on the captured video, the view providing a viewpoint of the physical environment.

2. The method of claim 1, wherein the view provides a left-eye viewpoint or a right-eye viewpoint of the physical environment.

3. The method of claim 1, wherein the one or more displays comprises a first display to display a left-eye viewpoint and a second display to display a right-eye viewpoint.

4. The method of claim 1, wherein the one or more cameras comprise a first camera capturing from a left-eye viewpoint and a second camera capturing from a right-eye viewpoint.

5. The method of claim 1 further comprising providing pass-through video via the HMD in which:

a first video captured via one or more left-eye outward facing cameras is presented on a left-eye display to provide a live view of a physical environment from the left-eye viewpoint; and a second video captured via one or more right-eye outward facing cameras is presented on a right-eye display to provide the live view of the physical environment from the right-eye viewpoint.

6. The method of claim 1, wherein the view is generated by altering the captured video to provide the view from an eye-specific viewpoint different than a viewpoint from which the video is captured.

7. He method of claim 1, wherein the rotation of the HMD corresponds to a rotation of a head upon which the HMD is worn.

8. The method of claim 1, wherein the motion corresponds to a change in a six degree of freedom pose of the HMD and a head upon which the HMD is worn.

9. The method of claim 1, wherein the maximum exposure time is determined based on the motion and a motion curve corresponding to a constant blur amount.

10. The method of claim 1 further comprising adjusting a gain based on the adjusting of the exposure to provide an approximately constant image brightness.

11. The method of claim 1, wherein the exposure is adjusted based on a minimum exposure determined to ensure noise is less than a threshold.

12. The method of claim 11, wherein the minimum exposure is determined based on a measure of light, a tone mapping, or an image sensor histogram.

13. The method of claim 1, wherein exposure is adjusted based on a minimum exposure determined based on a persistence of the display, the persistence of the display corresponding to an amount of time each frames is displayed.

14. The method of claim 1, wherein the exposure is adjusted based on user gaze direction.

15. The method of claim 1, where the exposure is adjusted based on determining whether a gaze direction is tracking a moving object.

16. The method of claim 1, wherein the exposure is adjusted based on a distance or contrast of a portion of a physical environment at which a user is gazing.

17. The method of claim 1, wherein the exposure is adjusted based on a head motion prediction.

18. The method of claim 1, wherein the HMD adjusts the exposure of two imaging components, each of the imaging components providing live video to one or two displays of the HMD device.

19. The method of claim 1, wherein the exposure parameter is determined based on determining that the physical environment includes a flickering light source.

20. The method of claim 19, wherein the exposure parameter is determined based on selecting an exposure time corresponding to a multiple of a flicker of the flickering light source.

21. The method of claim 20 further comprising disabling motion-based exposure reduction based on the flickering light source.

22. A head-mounted device (HMD) comprising:

a motion sensor;

a left-eye display;

a right-eye display;

one or more left-eye outward facing cameras associated with a left-eye viewpoint;

one or more right-eye outward facing cameras associated with a right-eye viewpoint;

a non-transitory computer-readable storage medium; and one or more processors coupled to the non-transitory computer-readable storage medium, wherein the non-transitory computer-readable storage medium comprises program instructions that, when executed on the one or more processors, cause the HMD to perform operations comprising:

providing pass-through video via the HMD in which video captured via the one or more left-eye outward facing cameras is presented on the left-eye display to provide a live view of a physical environment from the left-eye viewpoint and video captured via the one or more right-eye outward facing cameras is presented on the right-eye display to provide the live view of the physical environment from the right-eye viewpoint;

detecting a current motion corresponding to a current rotation of the HMD during the capture of multiple frames by the one or more cameras in a physical environment, wherein the current rotation is detected using an inertial measurement unit or a gyroscope;

predicting a continued rotation of the device for one or more next frames after the multiple frames based on the current rotation;

determining an exposure parameter to limit the appearance of blur that would result from the continued rotation of the HMD, wherein the exposure parameter is a maximum exposure time resulting in a predetermined level of blur on an image sensor;

adjusting an exposure of the one or more left-eye outward facing cameras and the one or more right-eye outward facing cameras to provide the pass-through video comprising the one or more next frames based on the determined exposure parameter; and presenting the video on the display of the HMD.

23. A non-transitory computer-readable storage medium, storing program instructions computer-executable on a computer to perform operations comprising:

detecting a current motion corresponding to a current rotation of the HMD during the capture of multiple frames by the one or more cameras in a physical environment, wherein the current rotation is detected using an inertial measurement unit or a gyroscope;

predicting a continued rotation of the device for one or more next frames after the multiple frames based on the current rotation;

determining an exposure parameter to limit the appearance of blur that would result from the continued rotation of the HMD, wherein the exposure parameter is a maximum exposure time resulting in a predetermined level of blur on an image sensor;

adjusting an exposure of one or more cameras based on the determined exposure parameter;

capturing video comprising the one or more next frames of the physical environment via the one or more cameras of the HMD according to the adjusted exposure; and presenting a view on the one or more displays of the HMD based on the captured video, the view providing a viewpoint of the physical environment.

24. The method of claim 1, further comprising determining a second exposure parameter to ensure noise is less than a threshold, wherein the second exposure parameter is a minimum exposure determined to correspond to a threshold maximum amount of noise approximated using light in the physical environment, wherein the exposure is adjusted based on determined exposure parameter and the determined second exposure parameter.

* * * * *